United States Patent
Sahin et al.

(10) Patent No.: US 12,395,962 B2
(45) Date of Patent: Aug. 19, 2025

(54) TRANSMISSION OF POSITIONING REFERENCE SIGNALS FOR SIDELINK COMMUNICATIONS

(71) Applicant: TOYOTA JIDOSHA KABUSHIKI KAISHA, Toyota (JP)

(72) Inventors: Taylan Sahin, Munich (DE); Torsten Wildschek, Gloucester (GB); John Kenney, Mountain View, CA (US); Takayuki Shimizu, Mountain View, CA (US); Ling Yu, Kauniainen (FI); Mikko Saily, Laukkoski (FI)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/957,695

(22) Filed: Nov. 23, 2024

(65) Prior Publication Data
US 2025/0119865 A1  Apr. 10, 2025

Related U.S. Application Data

(63) Continuation of application No. 18/860,648, filed as application No. PCT/JP2023/016533 on Apr. 26, 2023.

(60) Provisional application No. 63/335,522, filed on Apr. 27, 2022.

(51) Int. Cl.
*H04W 64/00* (2009.01)
*H04W 92/18* (2009.01)

(52) U.S. Cl.
CPC ............ *H04W 64/00* (2013.01); *H04W 92/18* (2013.01)

(58) Field of Classification Search
None
See application file for complete search history.

(56) References Cited

U.S. PATENT DOCUMENTS

| | | |
|---|---|---|
| 2022/0015057 A1 | 1/2022 | Bao et al. |
| 2022/0110088 A1 | 4/2022 | Bao et al. |
| 2022/0229146 A1 | 7/2022 | Ko et al. |
| 2022/0322274 A1* | 10/2022 | Keating ............... H04W 64/00 |
| 2022/0386093 A1 | 12/2022 | Baek et al. |

FOREIGN PATENT DOCUMENTS

| | | |
|---|---|---|
| WO | WO 2020/251318 A1 | 12/2020 |
| WO | WO 2021/096322 A1 | 5/2021 |
| WO | WO 2022/211889 A1 | 10/2022 |

OTHER PUBLICATIONS

3GPP TR 38.845 V17.0.0, "Study on scenarios and requirements of in-coverage, partial coverage, and out-of-coverage NR positioning use cases," (Release 17), Sep. 2021, pp. 1-16.

(Continued)

*Primary Examiner* — Suhail Khan
(74) *Attorney, Agent, or Firm* — Finnegan, Henderson, Farabow, Garrett, and Dunner, LLP

(57) ABSTRACT

A method for positioning in a sidelink communication. The method includes detecting, by an anchor component, a presence of at least one user equipment; and activating, by the anchor component, a transmission of a positioning reference signal to the user equipment responsive to the detected presence of the at least one user equipment.

19 Claims, 8 Drawing Sheets

(56) References Cited

OTHER PUBLICATIONS

"System Architecture and Solution Development; High-Accuracy Positioning for C-V2X—5G Automotive Association." [Online]. Available: https://5gaa.org/news/systemarchitecture-and-solution development-high-accuracy-positioning-for-c-v2x/ accessed Nov. 12, 2021, 4 pgs.

3GPP TR 37.985 V16.0.0, "Overall description of Radio Access Network (RAN) aspects for Vehicle-to-everything (V2X) based on LTE and NR," (Release 16), Jun. 2020, pp. 1-35.

3GPP R2-2111636, "Running 38.305 CR for Positioning WI on RAT dependent positioning methods", 3GPP TSG-RAN2 Meeting #116-e, Nov. 2021, 78 pgs.

ETSI EN 302 637-2 V1.4.1, "Intelligent Transport Systems (ITS); Vehicular Communications; Basic Set of Applications; Part 2: Specification of Cooperative Awareness Basic Service," Jan. 2019, pp. 1-45.

ETSI EN 302 637-3 V1.2.1, "Intelligent Transport Systems (ITS); Vehicular Communications; Basic Set of Applications; Part 3: Specifications of Decentralized Environmental Notification Basic Service," Sep. 2014, pp. 1-73.

SAE J2735 "Dedicated Short Range Communications (DSRC) Message Set Dictionary" Nov. 2009, 359 pgs.

\* cited by examiner

TRANSMISSION OF POSITIONING REFERENCE SIGNALS FOR SIDELINK COMMUNICATIONS

CROSS REFERENCES TO RELATED APPLICATIONS

This application is a continuation of U.S. application Ser. No. 18/860,648, which is a national phase of International Application No. PCT/JP2023/016533, filed Apr. 26, 2023, which claims the benefit of U.S. Provisional Application No. 63/335,622, which was filed on Apr. 27, 2022. The entire contents of the above referenced applications are incorporated herein by reference.

TECHNICAL FIELD

This invention relates to a method for positioning in a sidelink communication, an apparatus for positioning in a sidelink communication and a non-transitory computer-readable medium.

BACKGROUND ART

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks. In addition, or alternatively, devices can communicate directly between each other without going through the wireless communication network, or without utilizing the wireless communication network, at some times or all times.

In the context of vehicles or other mobile apparatus, communication networks can be configured to provide communication among vehicles (or integrated components) which are equipped with wireless interfaces. There are numerous approaches to implement such wireless communication network, such as in the 802.xx air interfaces promulgated by the Institute of Electrical and Electronics Engineer ("IEEE"). Another approach to such wireless communication networks corresponds to cellular-based communication networks, specifically, the New Radio (NR) and its capability to support sidelink (SL) communication.

SUMMARY OF INVENTION

The present invention in its first aspect provides a method for positioning in a sidelink communication. The method comprises: detecting, by an anchor component in the sidelink communication, a presence of at least one user equipment in the sidelink communication; and activating, by the anchor component, a transmission of a positioning reference signal to the at least one user equipment for positioning responsive to the detected presence of the at least one user equipment.

The present invention in its second aspect provides an apparatus for positioning in a sidelink communication. The apparatus comprises: a memory storing an instruction; and a processor configured to execute the instruction stored in the memory to: detect a presence of at least one user equipment in the sidelink communication, and activate a transmission of a positioning reference signal to the at least one user equipment responsive to the detected presence of the at least one user equipment.

The present invention in its third aspect provides a non-transitory computer-readable medium storing instructions that are executable by one or more processors of an apparatus to perform a method for positioning in a sidelink communication. The method comprises: detecting, by an anchor component in the sidelink communication, a presence of at least one user equipment in the sidelink communication; and activating, by the anchor component, a transmission of a positioning reference signal to the user equipment for positioning responsive to the detected presence of the at least one user equipment.

BRIEF DESCRIPTION OF DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DESCRIPTION OF EMBODIMENTS

Figure 1:
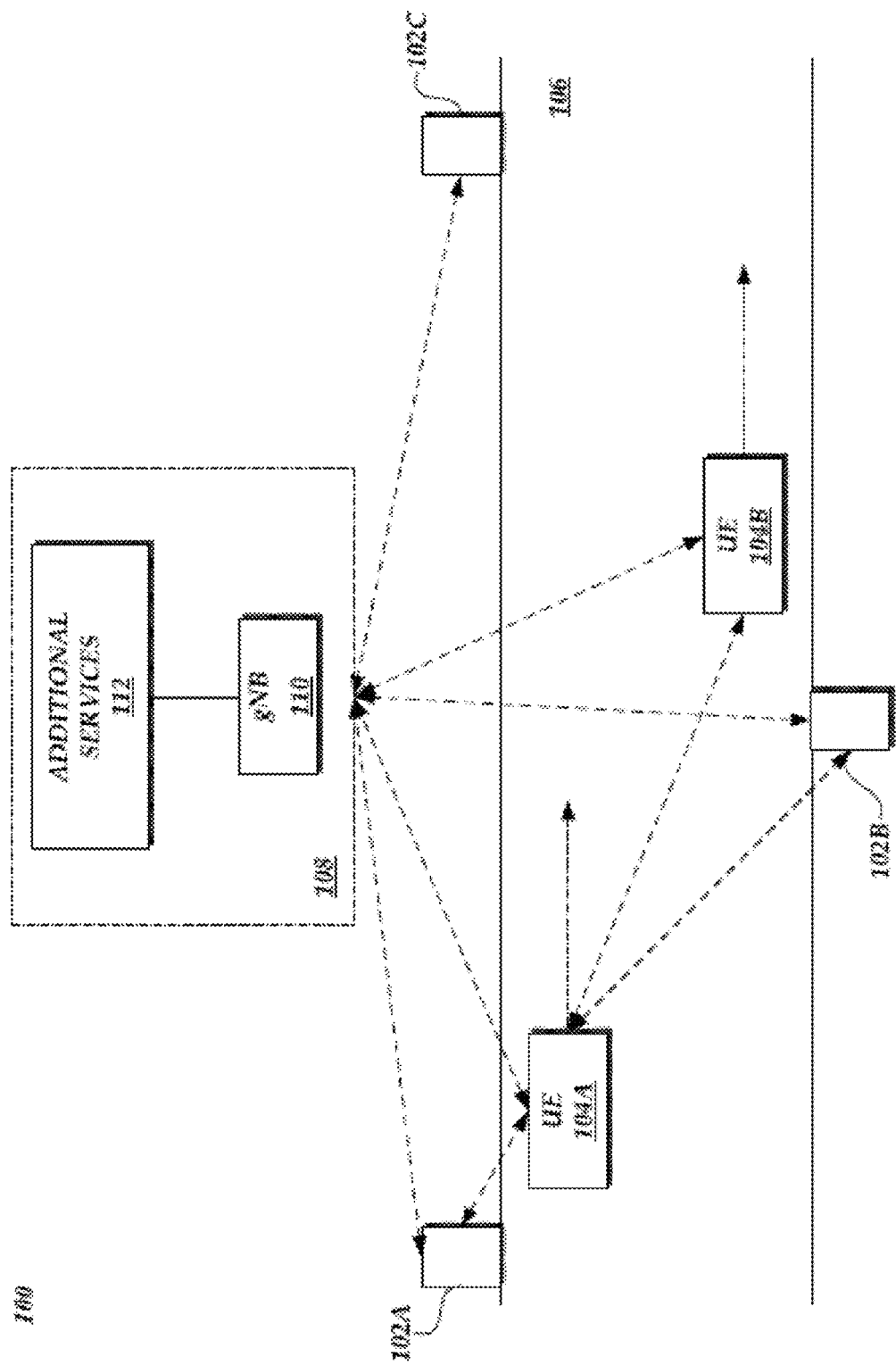
FIG. 1 is a block diagram depicting an exemplary communication system, consistent with some embodiments of the present application.

Aspects of the present disclosure relate to systems and methods for exchange of positioning information and/or signals. Generally described, one approach to the exchange of positioning information and/or signals includes deploying a set of one or more devices along roads or other areas of transmit which can communicate with mobile UEs. Illustratively, the devices that transmit Positioning Reference Signal (PRS) can correspond to one or more devices, which may be generally referred to as roadside units ("RSUs"), "anchors," or "UEs". Reference to RSUs or anchors throughout the present application is not intended to be limiting in any manner to configuration of any particular device or difference in functionality and should be considered interchangeable unless expressly described. Illustratively, RSUs are not considered mobile in nature (e.g., a permanent or semi-permanent location) and their locations can be easily acquired. For positioning by employing either timing-based (e.g., time difference of arrival (TDOA) or round-trip transmission (RTT)) or angle-based methods, transmissions of positioning reference signals (PRSs) from RSUs or/and from UEs are required for positioning relevant measurements.

To achieve positioning over the SL radio interface, UEs need to transmit/receive certain reference signals for positioning different from SL communication data, referred to generally as "SL positioning reference signals" (SL PRS). UEs conduct certain measurements (e.g., time of arrival, angle of arrival, etc.) on transmitted reference signals, which are then used to calculate individual position estimates. For purposes of illustration, components or entities that assist positioning this UE, e.g., by sending/receiving SL PRS, will be referred to as anchors. Aspects of the present application are described with regard to anchors being specific computing devices configured, at least in part, to provide positioning signals, such as SL PRS. Additionally, other UEs or devices or network entities supporting SL functionality, may also function as anchors for purposes of positioning. SL PRS can be configured in terms of various parameters including time-frequency resources, such as bandwidth and periodicity; directivity-related parameters such as beam direction, beam width, number of beams, etc.; and transmit power.

UEs can regularly exchange information on their status (speed, direction, heading, etc.) to inform each other about their presence and mobility, as well as certain road conditions. Such information can be transmitted via Cooperative Awareness Messages (CAMs) and Decentralized Environmental Notification Messages (DENMs) as defined by the European Telecommunications Standards Institute (ETSI) and Basic Safety Messages (BSMs) defined by the Society of Automotive Engineers (SAE). While CAMs are required to be periodically broadcast, e.g., every 100 ms, by all vehicles, DENMs are rather event-triggered messages notifying of a certain event, such as broadcast upon a collision on the road. Upon receiving such messages, vehicles can adjust their maneuvers and efficiently cooperate for a safer and more efficient road traffic. In long term evolution (LTE) vehicle-to-everything communications (V2X) PC5 and new radio (NR) V2X PC5, CAMS and DENMs and other V2X application messages can be transmitted via SL (besides uplink (UL) and downlink (DL)) to support a variety of use cases ranging from basic safety to vehicular platooning, from extended sensors to cooperative automated driving.

Compared to existing UL/DL positioning methods, SL positioning has the advantage of operating outside (or in partial) network coverage, in addition to in-coverage conditions, where network-based positioning is not applicable or not able to satisfy positioning Quality of Service (QOS) requirements (e.g., due to fewer anchor gNB nodes available), or when UEs are beyond the reach of Global Navigation Satellite System (GNSS) and/or network coverage (e.g., in tunnels).

Aspects of the present disclosure relate to systems and methods for exchange of positioning signals. More specifically, one or more aspects of the present application relate to dynamic activation of anchors or network nodes with SL functionality and/or transmission of PRS based on UE detection. One or more aspects of the present application further relate to proactive configuration of additional RSUs/anchors with a geographic region/path. Illustratively, an initial anchor detects a presence of one or more UE(s) (e.g., vehicles) based on its/their SL transmission(s). The detecting RSU/anchor responsively activates SL PRS transmissions based on the presence and mobility information of the detected one or more UE(s) acquired via their SL transmissions. The detecting RSU/anchor can then transmit notification regarding the detected one or more UE(s) to an infrastructure equipment, e.g., a core network component. For the sake of simplicity, the term "infrastructure equipment" and the terms "network," "network infrastructure," and "core network component" are used interchangeably in this application.

Based on the detected UE(s), the network or anchors can proactively configure SL PRS transmissions to be activated. In one example, the proactive configuration can be based on UE density, directivity, etc. or any other information carried via the SL transmissions of the detected one or more UE(s). In another example, the proactive configuration can be based on receipt of messages explicitly indicating the positioning request of one or more UE(s). The proactive configuration will illustratively include additional anchor(s) (one or more) along the future predicted trajectory of the detected UEs.

The detecting anchor(s) can also transmit the SL PRS configuration to the detected one or more UE(s) so that UEs are aware of the activated SL PRS transmissions. This may include more than one SL PRS configuration, as part of a list sent to the UE by the detecting RSU/anchor. The receiving UE(s) may be configured to measure SL PRS transmissions and utilize the list of the SL PRS configurations to process the SL PRS transmission information. The order information can include a priority order of two or more configurations for performing measurements, and a threshold (based on time, signal power, signal quality, distance, etc.) for the UE to switch between measuring or activating different PRS configurations along its trajectory. Additionally, information can include information to the UE(s) about currently inactive SL PRS configuration(s) so that UEs can later request it/them, e.g., based on changing positioning quality of service (QOS) requirement, based on the radio condition, or UE(s) entering a RSU/anchor area where the PRS transmission is currently not active.

The anchor or network can further deactivate SL PRS transmission(s) based on vanishing vehicles, e.g., no more received messages for a certain time-out threshold since the previous reception of CAM from the target UE, and/or SL Reference Signal Received Power (RSRP) and/or SL Receive Strength Signal Indicator (RSSI) and/or signal quality is below a certain threshold for a certain time-out threshold. The time-out threshold and signal threshold(s) may be pre-configured or configured.

Although aspects of the present application will be described with regard to illustrative network components, interactions, and routines, one skilled in the relevant art will appreciate that one or more aspects of the present application may be implemented in accordance with various environments, system architectures, computing device architectures and the like. Similarly, reference to specific devices, such as RSUs, UEs, gNBs, can be considered to be general references and not intended to provide additional meaning or configurations for individual computing devices. In further embodiments, besides the vehicular/pedestrian/cyclist UE(s), the UE can be also an Internet of Things (IoT) or a commercial device with SL functionality, that needs to be positioned via SL, considering many different use cases that SL positioning needs to support. Additionally, reference to any specific types of data types, structures or interfaces are also intended solely for purposes of illustration and should not be construed as limiting. Accordingly, all examples are intended to be illustrative in nature and should not be construed as limiting.

FIG. 1 depicts a block diagram of an exemplary communication system (environment) 100 for implementing one or more aspects of the present application. The environment 100 can comprise a first set of device(s) 102 (e.g., 102A, 102B) corresponding to RSU(s) that is/are located at fixed locations, such as defined locations along a transit area 106 (e.g., road or path). The environment 100 includes a second set of device(s) 104 (e.g., 104A, 104B) corresponding to UE(s) that is/are configured to be dynamically in motion, for example, along the transit area 106. In some embodiments, the RSU(s) 102 and UE(s) 104 may be in wireless communication with a gNB 110 of an infrastructure equipment 108, for example, RSU(s) 102 and the UE(s) 104 may be in a full-coverage or partial-coverage area of the wireless signals from the gNB 110. In some embodiments, the RSU(s) 102 and the UE(s) 104 may not be in wireless communication with the gNB 110, for example, the RSUs 102 and the UEs 104 may be in an out-of-coverage area of the wireless signals from the gNB 110. The RSU(s) 102 and UE(s) 104 can also be in wireless communication with one or more additional components 112 of the infrastructure equipment 108 that can offload processing of information or functionality associated with the wireless network, such as the gNB 110 and a location service (LCS) server (not shown). The gNB and LCS server can be connected to one or more additional component(s) 112.

The communication between the gNB 110 and the RSU(s) 102 and UE(s) 104 may correspond to a Radio Access Network (RAN), such as a Next Generation RAN (NG-RAN). Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), and additional variations or alternatives, including 3GPP 6G RAN.

The RAN illustratively implements a Radio Access Technology (RAT), such as a New Radio (NR), Long Term Evolution (LTE) also known as Evolved Universal Terrestrial Radio Access (EUTRA), Universal Mobile Telecommunication System (UMTS), etc. The RAT of the example system of environment 100 may illustratively be NR. Different names for the RAN nodes may be used, for example depending on the RAT used for the RAN. For the illustrative example of the system of mobile communications 100 in FIG. 1, the nodes of an NG-RAN 105 may be either a next generation Node B (gNB) 110 or a next generation evolved Node B (ng-eNB). In other applications, a RAN node may be referred to as Node B (NB) in a RAN that uses the UMTS RAT. A RAN node may be referred to as an evolved Node B (eNB) in a RAN that uses LTE/EUTRA RAT. However, as indicated above, the terms base station, RAN node, gNB, eNB and ng-eNB may be used interchangeably. Additionally, reference to the infrastructure equipment 108 may be used to reference the RAN node and additional core network equipment corresponding to a wireless network. Illustratively, the various aspects associated with infrastructure equipment 108 (gNB 110) can be implemented as one or more components that are associated with one or more functions or services. The components may correspond to software modules implemented by one or more computing device(s), which may be a separate stand-alone computing device.

Accordingly, the components of gNB 110 should be considered as a logical representation of the service, not requiring any specific implementation on one or more computing devices. Additionally, the infrastructure equipment (including any additional equipment not illustrated) may be maintained by an operator such as a Mobile Network Operator (MNO), a private network operator, a Multiple System Operator (MSO), an Internet of Things (IoT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IoT (IIOT), etc.

With continued reference to FIG. 1, illustratively the RSU(s) 102 and UE(s) 104 can exchange information and/or signals, such as positioning signals, in accordance with a sidelink communication channel. Illustratively, the sidelink communication channel can correspond to NR SL, which is a physical layer composed of several physical channels and signals. The SL physical channels are a set of resource elements carrying information of higher layers of the protocol stack. The SL physical channels can include the Physical Sidelink Broadcast Channel (PSBCH) that carries the SL-BCH transport channel where the Master Information Block (MIB) for SL is sent periodically and comprises system information for UE to-UE or UE to RSU communication. The PSBCH is transmitted along with the Sidelink Primary Synchronization Signal/Sidelink Secondary Synchronization Signal (S-PSS/SSS) in the S-SSB (synchronization signal block signals). The SL physical channels can further include a Physical Sidelink Feedback Channel (PSFCH) that is used to transmit the HARQ feedback from a receiver UE/RSU to the transmitter UE on the SL for a unicast or groupcast communication. The SL physical channels can also include a Physical Sidelink Shared Channel (PSSCH) and Physical Sidelink Control Channel (PSCCH).

Individual PSSCH, contains transport blocks that is associated with a PSCCH. The PSCCH is transmitted on the same slot as PSSCH and contains control information about the shared channel. The Sidelink Control Information (SCI) is split into two stages. The 1st stage is sent on PSCCH, which is associated with a PSSCH, and the 2nd stage is sent over the corresponding PSSCH. Demodulation Reference Signal (DMRS) is used for PSCCH, PSSCH, and PSBCH as reference signals for demodulation of messages in a receiver.

The UE(s) 104 may include wireless transmission and reception components for communications with one or more node(s) in the RAN, one or more relay node(s), or one or more anchor(s), or one or more other UE(s), etc. Examples of UE(s) include, but are not limited to, smartphones, tablets, laptops, computers, wireless transmission and/or reception units in a vehicle, V2X or Vehicle to Vehicle (V2V) devices, wireless sensors, internet of things (IoT) devices, industrial internet of things (IIOT) devices, etc. Other names may be used for UE(s) such as a Mobile Station (MS), Mobile Equipment (ME), terminal equipment, terminal node, client device, mobile device, etc.

Still further, UE(s) 104 may also include components or subcomponents integrated into other device(s), such as vehicle(s), to provide wireless communication functionality with node(s) in the RAN, other UE(s), RSU(s), satellite communication(s) as described herein. Such other device(s) may have other functionality or multiple functionalities in addition to wireless communications. Accordingly, reference to UE may include the individual components facilitating the wireless communication as well as the entire device that incorporates components for facilitating wireless communications.

Figure 2A:
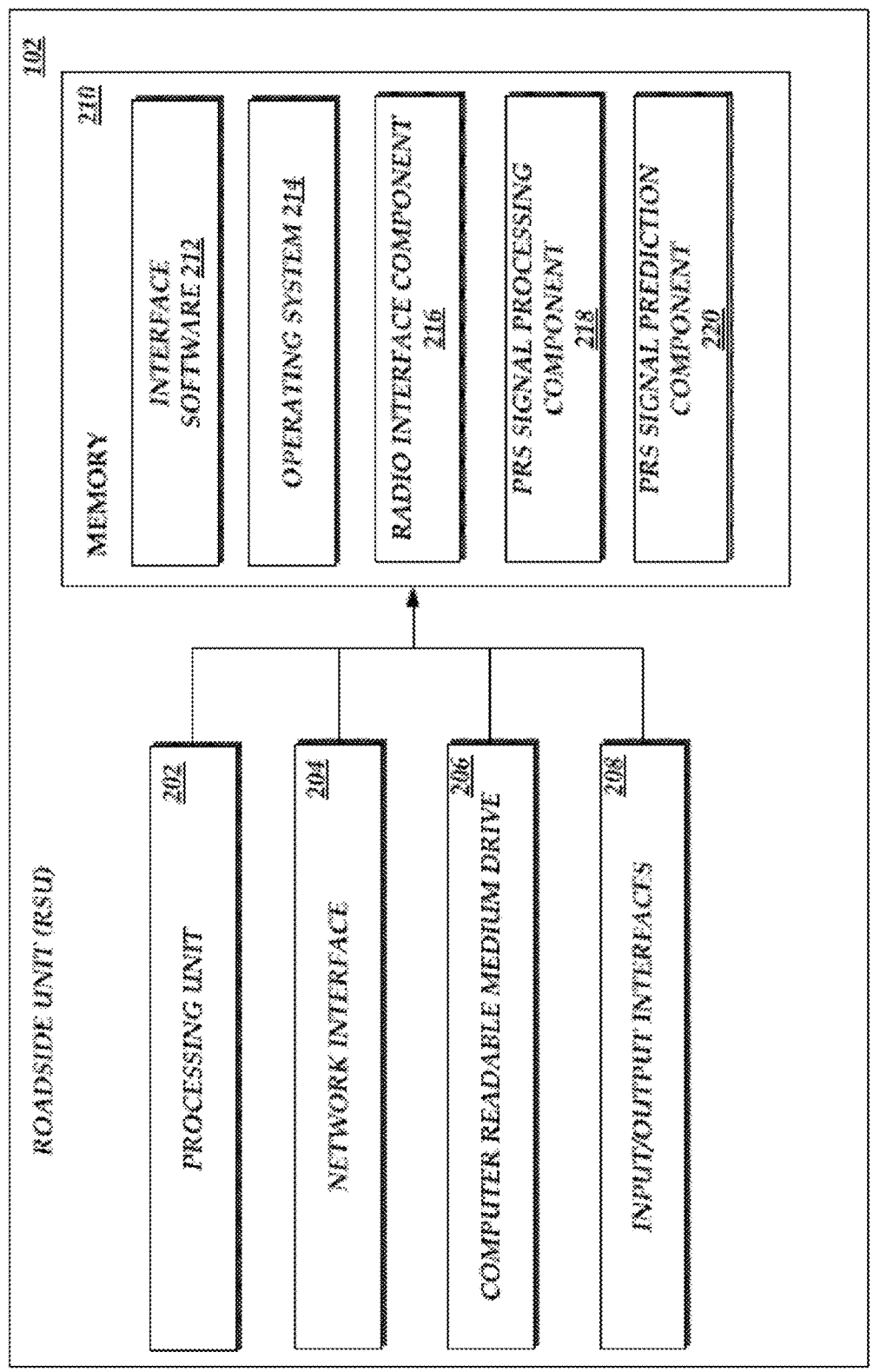
FIG. 2A depicts one embodiment of an architecture of an illustrative Road Side Unit (RSU) for implementing one or more aspects of the present application.

FIG. 2A depicts one embodiment of an architecture of an illustrative RSU 102 (or other anchor) for implementing one or more aspects of the present application as described. The general architecture of the RSU 102 depicted in FIG. 2A includes an arrangement of computer hardware and software components that may be used to implement aspects of the present disclosure. As previously discussed, the components of the RSU 102 may include physical hardware components, one or more virtualized components, or a combination thereof. Additionally, the components of the RSU 102 or the functionality attributed by the RSU 102 may be implemented in a virtualized environment.

Such virtualized environments may be provided by the manufacturer or by a third-party entity, such as a computing service provider that can instantiate software modules that may be persistent or temporary in nature for purposes of implementing the functionality depicted in the illustrative architecture for the RSU 102.

As illustrated, the RSU 102 includes a processing unit 202, a network interface 204, a computer-readable medium drive 206, and an input/output interface 208, all of which may communicate with one another by way of a communication bus. The components of the RSU 102 may be physical hardware components or implemented in a virtualized environment.

The network interface 204 may provide connectivity to one or more networks or computing systems, such as the wireless network depicted in FIG. 1. The processing unit 202 may thus receive information and instructions from other computing systems or services via a network. The processing unit 202 may also communicate to and from memory 210 and further provide output information via the input/output interface 208, including via SL physical channels and wireless communication channels. In some embodiments, the RSU 102 may include more (or fewer) components than those shown in FIG. 2A, including one or more antennas for facilitating transmission and receipt of wireless signals.

The memory 210 may include computer program instructions that the processing unit 202 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the RSU 102. The memory 210 may further include computer program instructions and other information for implementing aspects of the present disclosure. For example, in one embodiment, the memory 210 includes a radio interface component 216 for processing wireless signals from the wireless network 108, UEs 104 or other RSUs 102. The memory 210 includes a PRS information component 218 that is configured to provide PRS information to one or more UE(s) as described herein. The memory 210 may also include a PRS signal prediction component 220 that is configured to predict PRS signal(s).

Figure 2B:
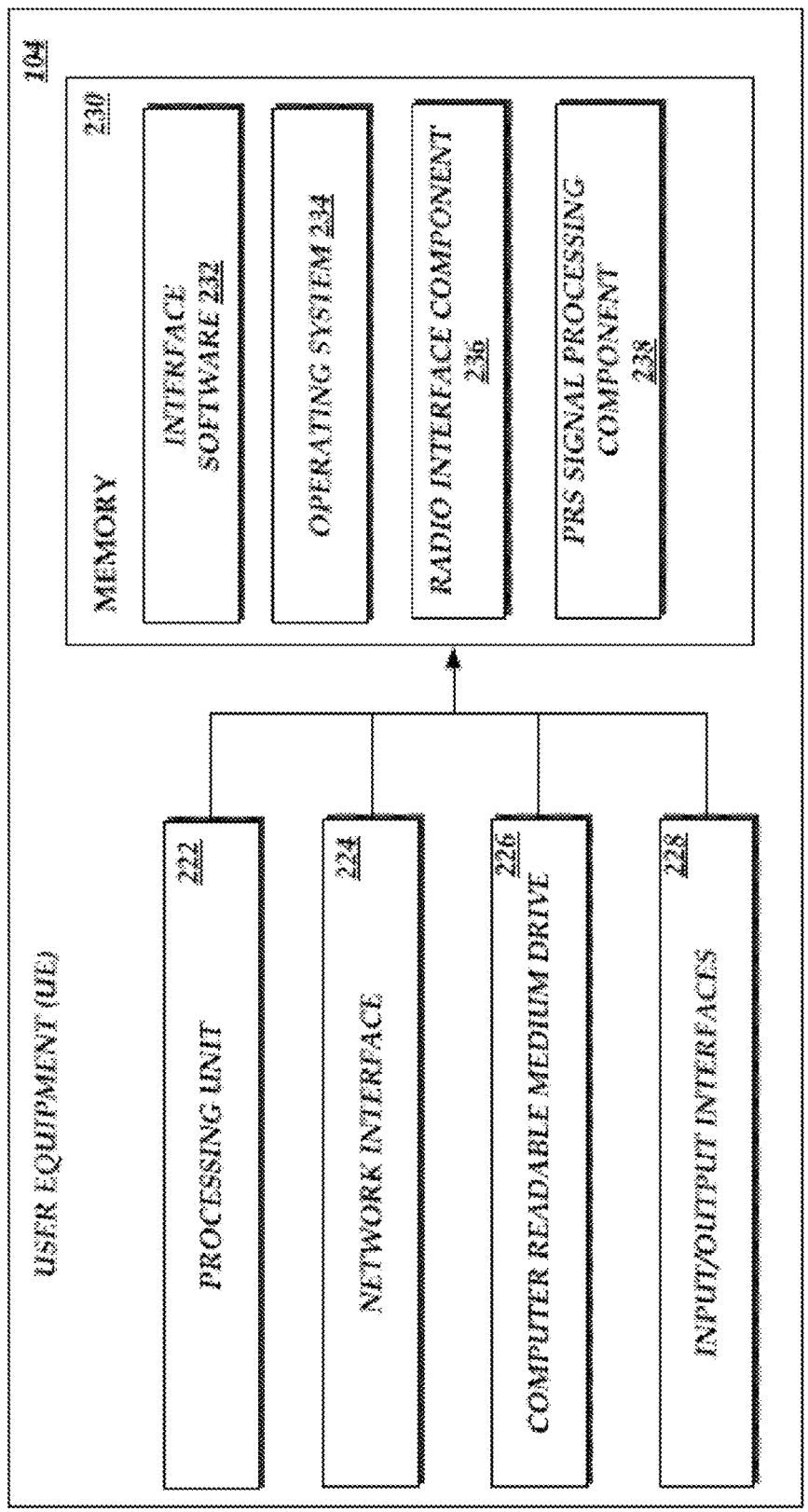
FIG. 2B depicts one embodiment of an architecture of an illustrative User Equipment (UE) for implementing one or more aspects of the present application.

FIG. 2B depicts one embodiment of an architecture of an illustrative UE 104 for implementing one or more aspects of the present application as described. The general architecture of the UE 104 depicted in FIG. 2B includes an arrangement of computer hardware and software components that may be used to implement aspects of the present disclosure. As previously discussed, the components of the UE 104 may include physical hardware components, one or more virtualized components, or a combination thereof. Additionally, the components of the UE 104 or the functionality attributed by the UE 104 may be implemented in a virtualized environment. Such virtualized environments may be provided by the manufacturer or by a third-party entity, such as a computing service provider that can instantiate software modules that may be persistent or temporary in nature for purposes of implementing the functionality depicted in the illustrative architecture for the UE 104.

As illustrated, the UE 104 includes a processing unit 222, a network interface 224, a computer-readable medium drive 226, and an input/output interface 228, all of which may communicate with one another by way of a communication bus. The components of the feedback UE 104 may be physical hardware components or implemented in a virtualized environment.

The network interface 224 may provide connectivity to one or more networks or computing systems, such as the wireless network depicted in FIG. 1. The processing unit 222 may thus receive information and instructions from other computing systems or services via a network. The processing unit 222 may also communicate to and from memory 230 and further provide output information via the input/output interface 228, including via SL physical channels. In some embodiments, the UE 104 may include more (or fewer) components than those shown in FIG. 2B. The memory 230 may include computer program instructions that the processing unit 202 executes in order to implement one or more embodiments. The memory 230 generally includes RAM, ROM, or other persistent or non-transitory memory. The memory 230 may store an operating system 234 that provides computer program instructions for use by the processing unit 222 in the general administration and operation of the UE 104. The memory 230 may further include computer program instructions and other information for implementing aspects of the present disclosure. For example, in one embodiment, the memory 230 includes a radio interface component 236 for processing wireless signals from the wireless network 108, other UEs 104 or RSUs 102. The memory 230 also includes a PSR information component 238 that is configured to request PSR information from one or more RSUs 102 as described herein.

Figure 2C:
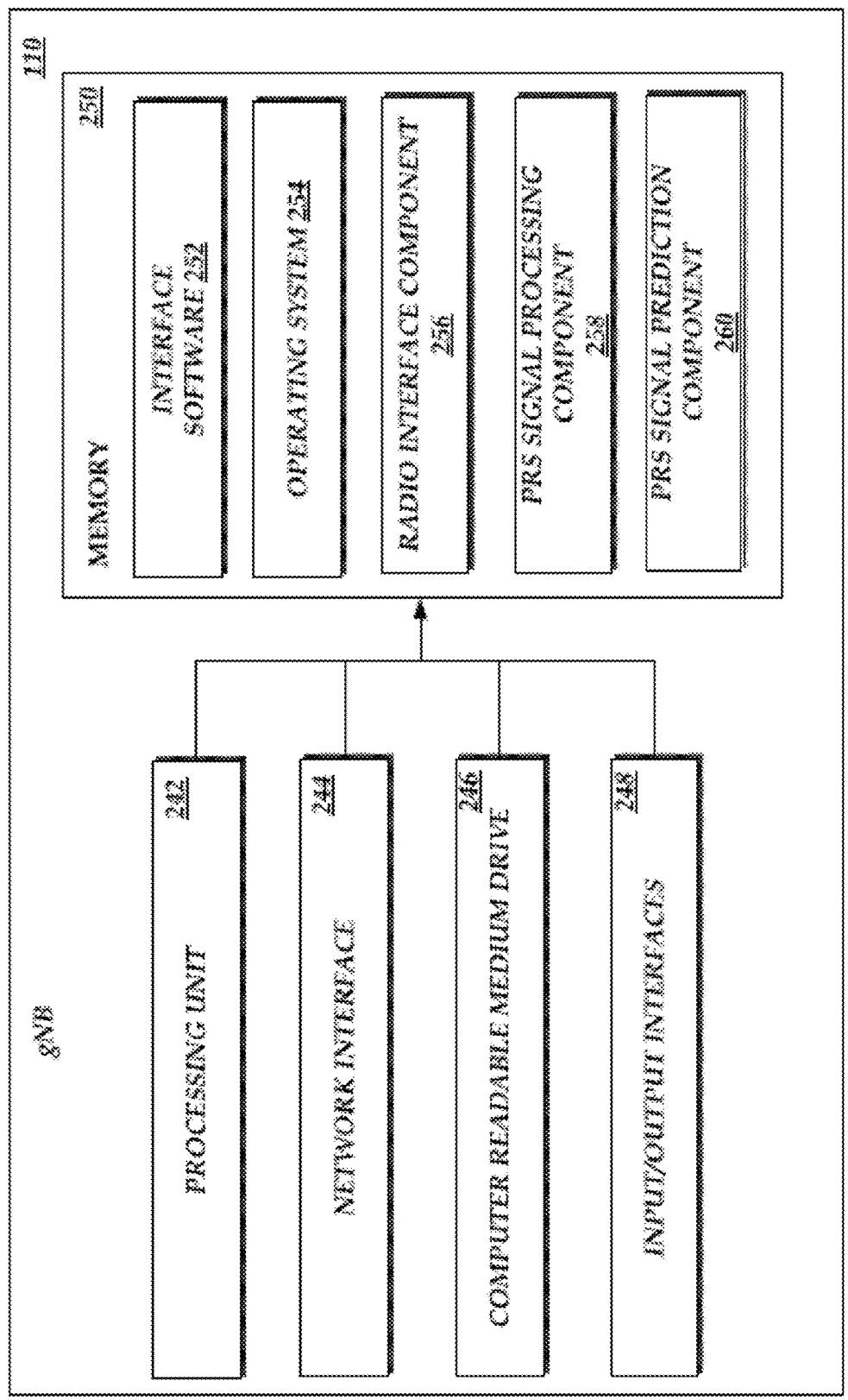
FIG. 2C depicts one embodiment of an architecture of an illustrative Next Generation Node B (gNB) for implementing one or more aspects of the present application.

FIG. 2C depicts one embodiment of an architecture of an illustrative gNB 110 for implementing one or more aspects of the present application as described. The general architecture of the gNB 110 depicted in FIG. 2C includes an arrangement of computer hardware and software components that may be used to implement aspects of the present disclosure. As previously discussed, the components of the gNB 110 may include physical hardware components, one or more virtualized components, or a combination thereof. Additionally, the components of the gNB 110 or the functionality attributed by the gNB 110 may be implemented in a virtualized environment. Such virtualized environments may be provided by the manufacturer or by a third-party entity, such as a computing service provider that can instantiate software modules that may be persistent or temporary in nature for purposes of implementing the functionality depicted in the illustrative architecture for the gNB 110.

As illustrated, the gNB 110 includes a processing unit 242, a network interface 244, a computer-readable medium drive 246, and an input/output interface 248, all of which may communicate with one another by way of a communication bus. The components of the feedback gNB 110 may be physical hardware components or implemented in a virtualized environment, including one or more antennas for facilitating transmission and receipt of wireless signals.

The network interface 244 may provide connectivity to one or more networks or computing systems, such as the wireless network depicted in FIG. 1. The processing unit 242 may thus receive information and instructions from other computing systems or services via a network. The processing unit 242 may also communicate to and from memory 250 and further provide output information via the input/output interface 248. In some embodiments, the gNB 110 may include more (or fewer) components than those shown in FIG. 2C.

The memory 250 may include computer program instructions that the processing unit 242 executes in order to implement one or more embodiments. The memory 250 generally includes RAM, ROM, or other persistent or non-transitory memory. The memory 250 may store an operating system 254 that provides computer program instructions for use by the processing unit 242 in the general administration and operation of the gNB 110. The memory 250 may include a radio interface component 256. The memory 250 may further include computer program instructions and other information for implementing aspects of the present disclosure. For example, in one embodiment, the memory 250 includes a PRS signal processing component 258 that is configured to provide PRS configuration information to one or more UE(s) 104 and one or more RSU(s) 102 as described herein. The memory 250 may also include a PRS signal prediction component 260 configured to predict PRS signal(s).

Figure 3:
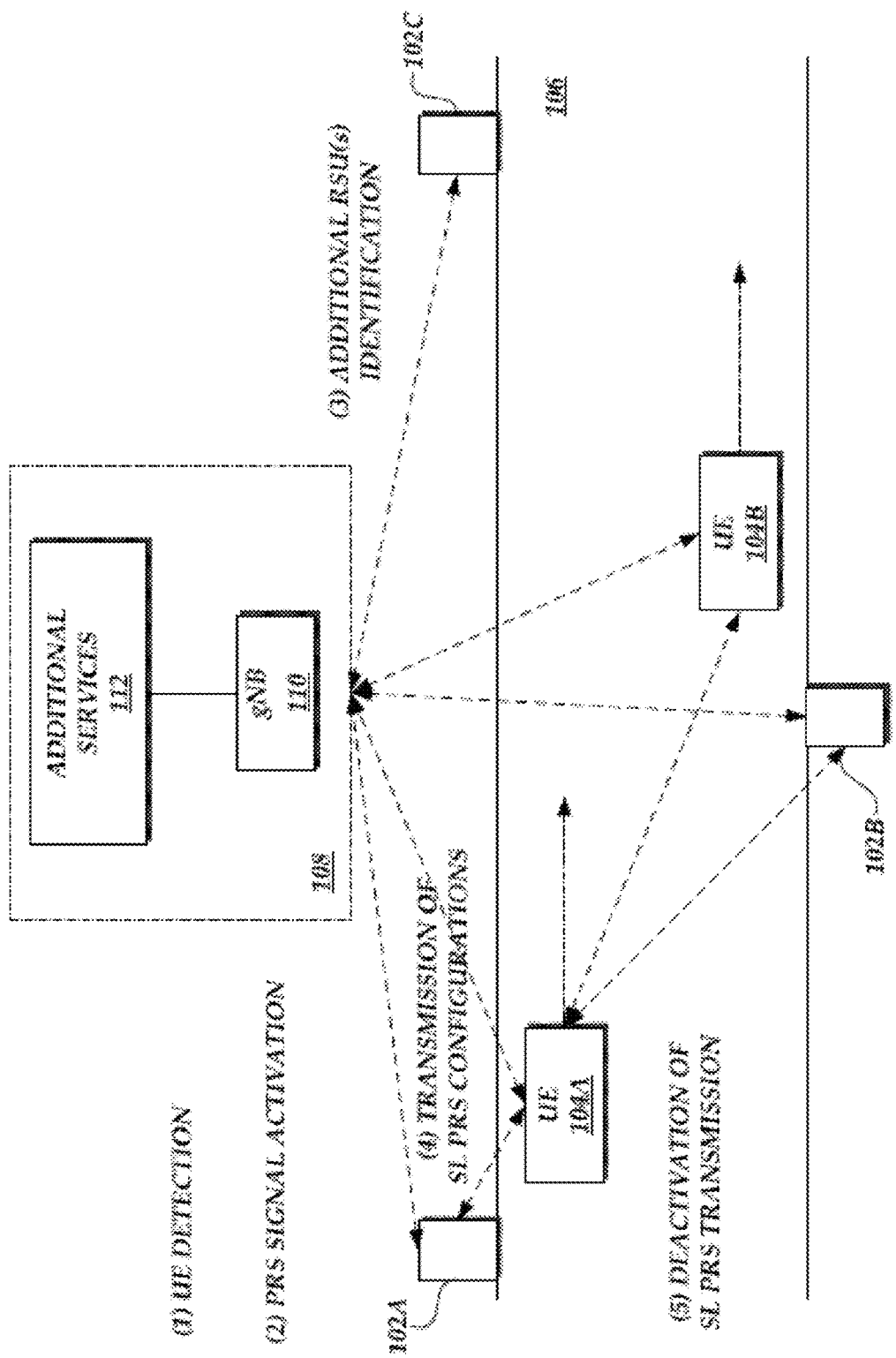
FIG. 3 is a block diagram illustrating an exemplary activation/deactivation of a Positioning Reference Signal (PRS) in the communication system of FIG. 1, consistent with some embodiments of the present application.

FIG. 3 is a block diagram illustrating an exemplary activation/deactivation of PRS signal(s) in the communication system of FIG. 1, consistent with some embodiments of the present application. With reference to FIG. 3, at step (1), the RSU/anchor 102A detects a presence of UE 104A (e.g., a vehicle) based on the SL transmission from the UE 104A. The RSU/anchor 102A may detect a presence of multiple UEs (e.g., 104A and 104B) based on the SL transmission from the UEs. For example, the RSU/anchor 102A may detect the presence of the UE 104A by decoding SL control message or data message received from the UE 104A. The message(s) can be in the form of V2X data transmitted via CAM(s) or DENM(s). The RSU/anchor 102A may also detect the presence of the UE 104A by measuring the received power over SL, e.g., SL Signal Received Power (SL RSRP), Signal Received Quality, Received Strength Signal Indicator (RSSI), and/or Signal Noise Ratio (SINR). For example, the RSU/anchor 102A may determine the presence of the UE 104A based on a determination that the received power is greater than a predetermined threshold. In some embodiments, the message can also be in the form of SL SCI, information in PFSCH, MAC Control Element (CE), or SL data payload that includes a request from the UE 104A, e. g., a positioning request from the UE 104A. In some embodiments, the RSU/anchor 102A may detect the presence of UE 104A locally, without a communication with the infrastructure equipment 108, for example, at a road tunnel or an underground parking lot. In other embodiments, the RSU/anchor 102A may detect the presence of UE 104A with a communication with the infrastructure equipment 108.

At step (2), the RSU/anchor 102A may activate SL PRS transmission(s) based on the presence and/or mobility information of the UE 104A. In some embodiments, in activating the SL PRS transmission(s), the RSU/anchor 102A does not need to be connected to or controlled by the infrastructure equipment 108. The RSU/anchor 102A may activate any pre-configured SL PRS locally by itself. Such an approach would be especially beneficial in terms of reduced latency and signaling overhead. The (pre)-configuration of the SL PRS can be performed by the infrastructure equipment 108, or by other means e.g., pre-configured in the USIM via for example SIM Toolkot.

In some embodiments, the infrastructure equipment 108 may pre-configure the SL PRS based on the SL positioning capability of the UEs. The infrastructure equipment 108 may collect capability information of the UEs related to SL positioning during or beforehand a positioning session. While existing LPP procedures via UL/DL can be used for this purpose, UEs can also indicate their capability information via MAC CE over SL along with other SL transmissions, such as CAMs indicating their positioning request.

In some embodiments, the infrastructure equipment 108 may proactively pre-configure the SL PRS based on the UE mobility and other SL information (implementation aspect). From the SL transmission(s) of UE(s) such as CAM(s)/DENM(s) indicating UE(s) speed, direction, etc., the infrastructure equipment 108 may acquire information relevant for configuring the SL PRS. For example, for high-speed vehicles, the infrastructure equipment 108 may configure SL PRS with high repetition rate, or SL PRS can be transmitted on antenna beams matching to the UE mobility parameters. Similarly, the infrastructure equipment 108 may determine the SL PRS configuration based on the confidence of the UE location information contained within the CAMs.

For example, for UEs having less confidence in accuracy, network may configure larger-bandwidth SL PRS transmissions for more accurately positioning them. In some embodiments, the infrastructure equipment 108 may pre-configure the SL PRS based on an explicit request for the UE(s). The UE(s) may indicate its/their positioning QOS requirement along with their positioning request to help the infrastructure equipment 108 to determine the SL PRS configuration(s).

In some embodiments, the infrastructure equipment 108 may determine the PRS transmission(s) prior to irrespective of any positioning session, for example, based on past history and statistical properties of the QoS and pre-configure the SL PRS. For example, vehicular UEs in a certain area at a certain time of the day would have similar capabilities, and demand similar positioning QoS, and network can pre-configure RSUs in this area with SL PRS matching to these conditions.

In some embodiment, the infrastructure equipment 108 may provide a "default" SL PRS configuration for RSUs in an area that would at least enable coarse positioning of UEs (e.g., with low accuracy, for the first location fix). In some embodiments, the infrastructure equipment 108 may proactively determine PRS transmissions on-demand or dynamically (e.g., during a positioning session), such configuration would better match to the individual needs of UE(s) or changing environment conditions. For this purpose, additional information, such as specific positioning QoS requirement may be indicated by the UE(s) to the infrastructure equipment 108.

In other embodiments, configuration and/or activation may be determined by a central entity such as the gNB 110 of the infrastructure equipment 108 or a Location Management Function (LMF) of a central location management server in the core network where multiple RSUs are connected to, which would enable better coordination across different RSUs. In this case, RSU/anchor 102A may inform the centralized positioning entity regarding the information of the detected UE 104A. For example, the RSU/anchor 102A may transmit a notification in accordance with LTE Positioning Protocol (LPP) protocols or NR Positioning Protocol (NRPP) protocols to communicate with the centralized positioning entity. The RSU/anchor 102A may inform the LMF about a vehicle approaching it with a certain speed and direction (e.g., acquired via CAMs transmitted on SL). In turn, the LMF configures and/or activates the RSU/anchor 102A.

At step (3), the RSU/anchor 102A may identify one or more additional RSU(s) along the future predicted trajectory of the detected UE 104A and activate one or more additional SL PRS transmission(s). In doing so, the RSU/anchor 102A may not need to be connected to or controlled by the infrastructure equipment 108. The RSU/anchor 102A may activate any preconfigured SL PRS locally by itself, leading to the reduced latency and signaling overhead. In some embodiments, instead of the RSU/anchor 102A, the infrastructure equipment 108 or the LMF may identify one or more additional RSU(s) along the future predicted trajectory of the detected UE 104A and activates the one or more additional SL PRS signal(s).

At step (4), the RSU/anchor 102A may transmit the SL PRS configuration(s) transmitted by different RSU(s)/anchor(s) to the detected UE 104A so that the UE 104A can be aware of the activated SL PRS transmission(s) and perform measurements on the PRS. The UE 104A may utilize a list of the SL PRS configurations to process the SL PRS transmission information. The SL PRS transmission information may include a priority order for two or more configurations for performing measurements. The SL PRS transmission information may also include a threshold (based on time, signal power, signal quality, distance, etc.) for the UE 104A to switch between different PRS configurations for the measurement along its trajectory.

Additionally, the infrastructure equipment 108 may inform the UE 104A about currently inactive SL PRS configuration(s) so that the UE 104A can later request them, e.g., based on changing positioning QOS requirement, based on radio condition, or UE entering a RSU area where the PRS transmission is currently not active.

At step (5), the RSU/anchor 102A may deactivate the SL PRS transmission(s) based on a determination of vanishment of the UE 104A. The RSU/anchor 102A may determine the vanishment of the UE 104A based on an absence of received messages for a certain (pre-) configured time-out threshold since the previous reception of CAM from the target UE. The RSU/anchor 102A may also determine the vanishment of the UE 104A based on that the SL RSRP and/or SL RSSI and/or signal quality is below a certain (pre-) configured threshold for a certain (pre-) configured time-out threshold.

In some embodiments, the deactivation of the SL PRS transmissions is performed by the infrastructure equipment 108. In FIG. 3 above, the infrastructure equipment 108 is shown as a wireless equipment including a gNB 110. However, the present application is not so limited. The infrastructure equipment 108 may be a GNSS that communicates with the RSU/anchor 102A and/or the UE 104A using satellite signals. Also, for simplicity, the above descriptions of FIG. 3 used an example in which the RSU/anchor 102A detects the UE 104A. However, the present application is not so limited. The RSU/anchor 102A may detect multiple UEs at the same time or sequentially.

Figure 4:
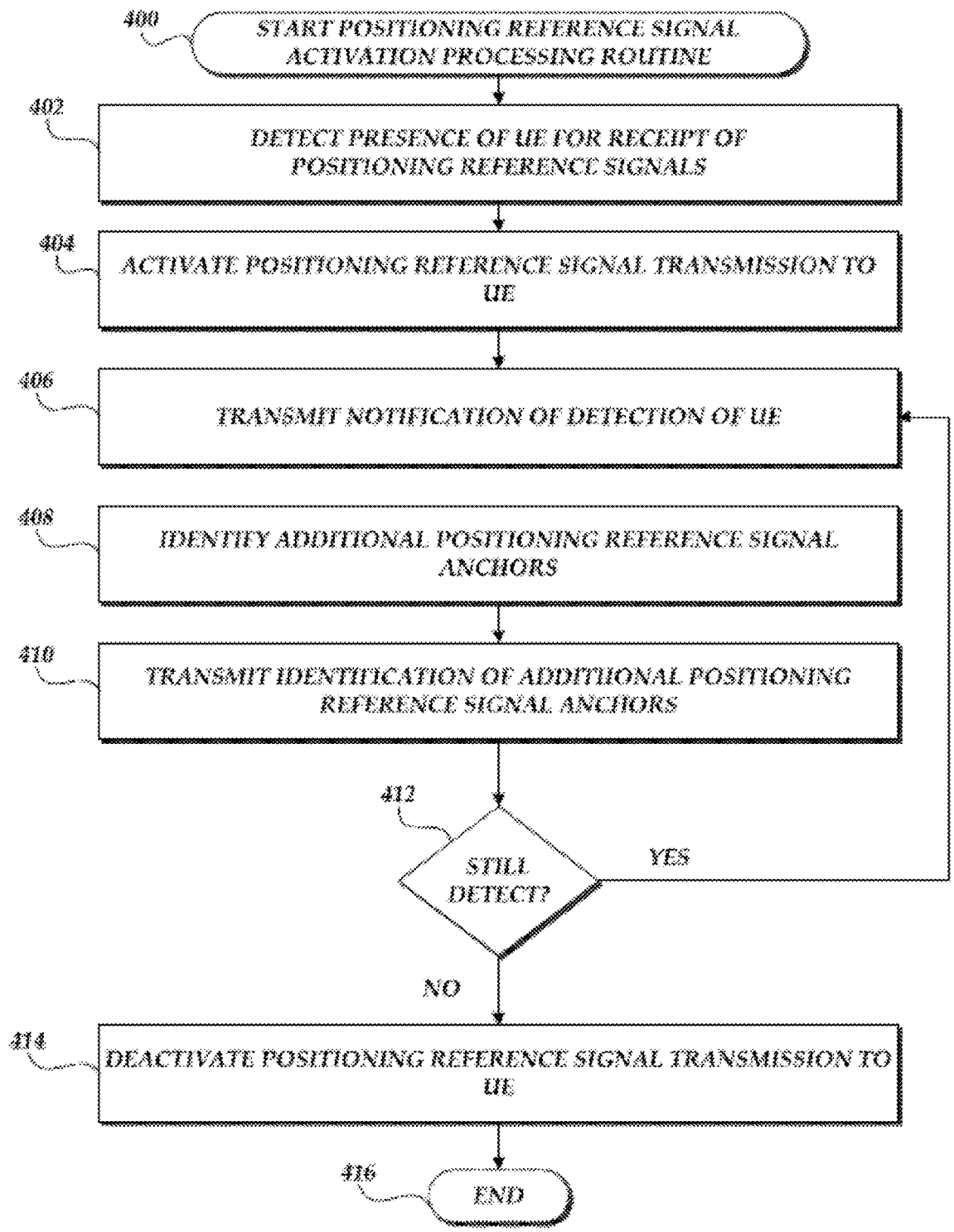
FIG. 4 is a flow diagram depicting an exemplary routine for PRS transmission activation and management implemented by a RSU, consistent with some embodiments of the present application.

FIG. 4 is a flow diagram depicting an exemplary routine for PRS transmission activation and management implemented by a RSU, consistent with some embodiments of the present application. Referring to FIG. 4, at a block 400, a routine for positioning reference signal activation is started. Aspects of the routine may be implemented by a RSU, such as the RSU 102 of FIG. 1, or a combination of the RSU 102 and the infrastructure equipment 108 of FIG. 1. The routine begins with the assumption that one or more RSU(s) are in a state of deactivation of PRS transmission and that a UE (e.g., the UE 104A in FIG. 1) is within wireless communication range to receive PRS transmission.

At a block 402, an initial RSU/anchor detects a presence of the UE (e.g., a vehicle) based on its/their SL transmission(s). Illustratively, RSUs or other network entities can sense or receive SL transmissions. For example, the RSU 102 can detect the presence of the UE 104, for example, by decoding received SL control or data messages. The messages can be in the form of V2X data (e.g., sent via CAM(s)/DENM(s)).

The message(s) can also be in the form of measurements or detection of the received power over SL, e.g., SL Signal Received Power (SL RSRP), Received Signal Quality, Received Strength Signal Indicator (RSSI) information and/or Signal noise Ratio (SINR) above/below one or more pre-configured threshold(s) to activate/deactivate SL PRS.

Additionally, the message can also be in the form of SL Control Information (SCI), information in PSFCH, MAC CE, or a part of SL data payload that can indicate a request of a UE, e.g., a positioning request.

At a block 404, the detecting RSU/anchor 102 responsively activates SL PRS transmission(s) based on the presence and mobility information of the UE acquired via their SL transmissions.

At a block 406, the detecting RSU/anchor 102A can then generate a notification regarding the detected UE and transmit the notification to an infrastructure equipment (core network components), such as the infrastructure equipment 108 of FIG. 1. Illustratively, the detecting RSU/anchor 102A can transmit notifications/information in accordance with LTE Positioning Protocol (LPP) protocols or NR Positioning Protocol (NRPP) protocols.

At a block 408, the RSU receives information identifying SL PRS transmission(s) to be activated. In one embodiment, as illustrated in FIG. 3A, the RSU 102 may process information to identify additional PRS transmission(s).

In another embodiment, as illustrated in FIG. 3B, the RSU may receive information identifying the additional PRS transmission(s), such as from infrastructure equipment 108. In one example, the proactive configuration can be based on UE density, directivity, etc. or any other information carried via the SL transmissions of the detected UE(s).

In another example, the proactive configuration can be based on receipt of message(s) explicitly indicating the positioning request of a UE. The proactive configuration will illustratively include additional RSU(s) along the future predicted trajectory of vehicle(s).

Figure 5:
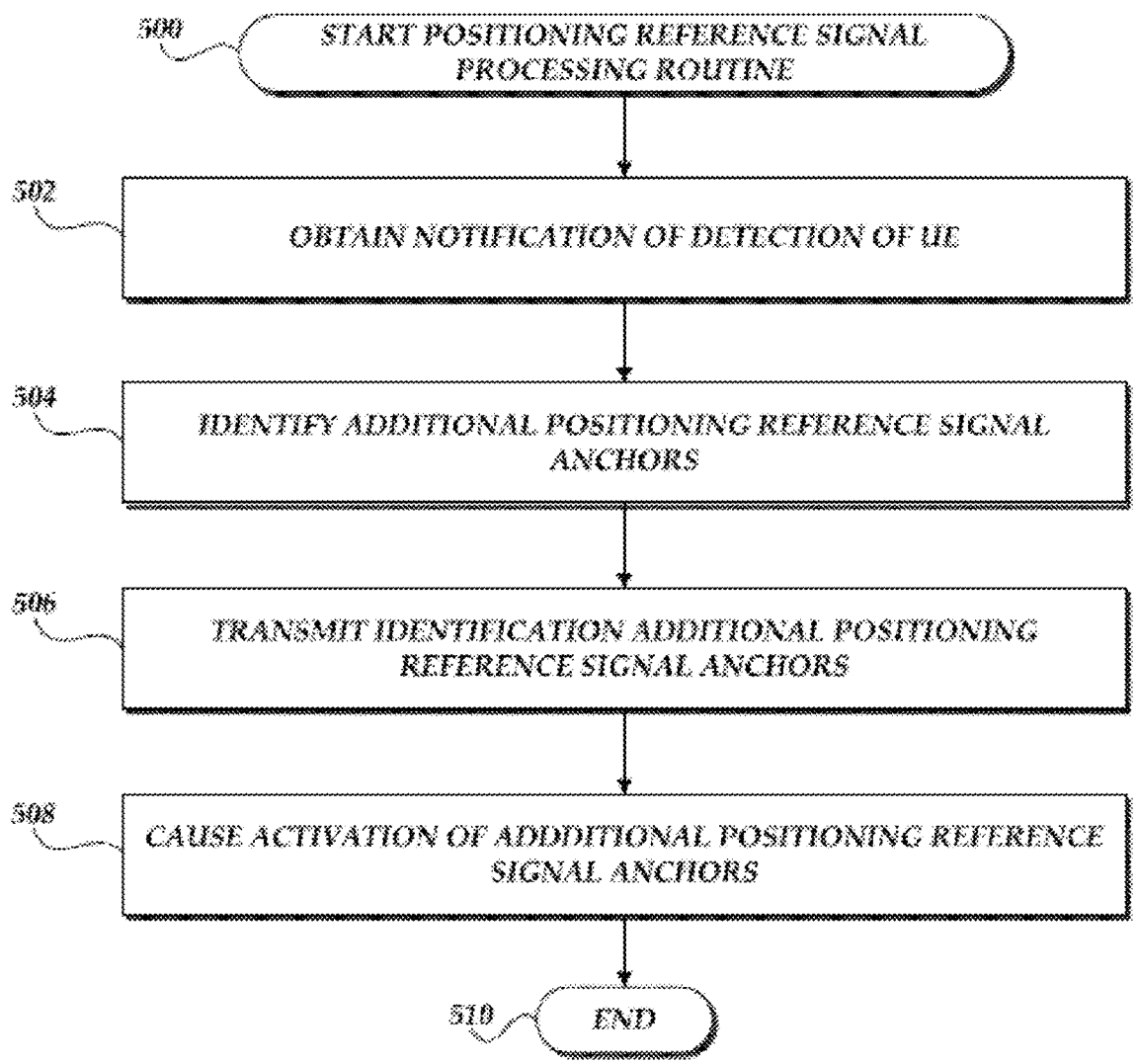
FIG. 5 is a flow diagram depicting an exemplary routine for PRS transmission activation and management implemented by a gNB, consistent with some embodiments of the present application.

In some embodiments, RSU(s) do not need to be connected to or controlled by the network, and this way activate/deactivate any preconfigured SL PRS locally by itself/themselves. Such an approach would be especially beneficial in terms of reduced latency and signaling overhead. Additional details regarding proactive identification of PRS transmission(s) will be described with regard to routine 500 (FIG. 5).

In embodiments in which the RSU determines additional PRS transmission(s), the RSU can signal the detecting infrastructure equipment regarding the identified PRS transmission(s). Illustratively, the detecting RSU/anchor 102A can receive notifications/information in accordance with LTE Positioning Protocol (LPP) protocols or NR Positioning Protocol (NRPP) protocols.

At a block 410 the detecting RSU(s)/anchor(s) 102A can also transmit the SL PRS configuration(s) to the detected UE(s) 104A so that UE(s) is/are aware of activated SL PRS transmission(s). The receiving UE(s) may be configured to measure SL PRS transmissions and utilize a structured list of the SL PRS configurations to process the SL PRS transmission information. The ordered information can also include a priority order of the two or more configurations for performing measurements, and/or one or more threshold(s) (based on time, signal power, signal quality, signal to noise ratio and/or distance, etc.) for the UE to switch between measuring different PRS configuration(s) along its trajectory.

Additionally, information can include information about currently inactive SL PRS configuration(s) so that UE(s) can later request it/them, e.g., based on changing positioning QoS requirement, based on radio condition, and/or UE entering a RSU area where the PRS transmission is currently not active.

Illustratively, for the UE(s) to be aware of activated SL PRS transmission(s) and measure it/them, RSUs/network proactively provides to the UE(s) the activated SL PRS configuration, or the list of activated SL PRS configurations (e.g., belonging to different RSUs) to the UE(s).

In some embodiments, the list can correspond to a structured list with associated priority order among PRS configurations to be measured by the UE, and/or a threshold indication (e.g., with respect to received SL PRS power, distance, etc.) to enable UE to switch between measuring different PRS configurations e.g. along its trajectory.

Given that a UE already knows active SL PRS configurations, UEs can be configured to conduct measurements on them with respect to indicated order of priority, and switch between them based on the provided threshold(s). This way, additional signaling to request, deliver, and switch-off SL PRS configuration(s) that would cost additional latency is avoided. In an embodiment, UE(s) may be configured with the different set of SL PRS configuration(s) and each set configuration has an index. The activation/inactivation of certain SL PRS configuration(s) from RSU/network as well as the request of SL PRS configuration from UE(s) indicates the corresponding index.

Illustratively, the infrastructure equipment 108 can provide this information to UE(s) via RSU(s)/anchor(s) over SL, e.g., using SL data payload. Alternatively, gNB(s) 110 or TRP(s) can provide this information via DL, e.g., via RRC message(s) (for example SIB message(s)). The provisioning of the information can be done specifically, periodically or upon certain condition(s)/event(s), e.g., when the network detects a presence of a vehicle or its positioning request. Additionally, the information can be broadcast to all vehicles in a certain area, groupcast to a certain group of vehicles (e.g., a vehicle platoon), or unicast to a single vehicle that requested positioning. In addition, RSU/network can also provide inactive SL PRS configuration(s) for the UE(s) that can be activated in the future e.g., based on their changing positioning QoS requirements.

At a decision block 412, the RSU determines whether one or more UE(s) is/are still detectable. If so, routine 400 can return to block 406. In one embodiment, the activation or deactivation is based on at least the presence of a UE. Presence of a UE can be checked by RSU(s) or other network entities with SL functionality, based on their sensing or reception of the SL transmission. In an embodiment, this could be simply done by sensing or measuring received SL signal-to-noise ratio, SL Quality or SL power, e.g., SL RSRP and/or RSSI above/below one or more (pre-) configured threshold(s).

In another embodiment, the RSU/network determines the configuration of a SL PRS to activate based on further information it acquires from SL transmissions of the UE(s), such as by decoding received SL control or data message(s) including V2X data (e.g., sent via CAM(s)/DENM(s)) indicating mobility information such as the speed and direction of the vehicle. Alternatively, at block 414, the RSU/network can further deactivate SL PRS transmission(s) based on vanishing vehicles, e.g., no more received messages for a certain (pre-) configured time-out threshold since the previous reception of CAM from the target UE, and/or SL signal-to-noise and/or SL RSRP and/or SL RSSI and/or signal quality is below one or more pre-configured threshold(s) e.g., for a certain configured time-out threshold. Routine 400 terminates at block 416.

FIG. 5 is a flow diagram depicting an exemplary routine for PRS transmission activation and management implemented by a gNB, consistent with some embodiments of the present application. Referring to FIG. 5, at a block 500, a routine for proactively identifying PRS transmission in accordance with various aspects of the present application is started. The routine is performed by a network infrastructure (also called a network), such as the infrastructure equipment 108 of FIGS. 1 and 3.

In some embodiments, besides the RSU(s), other network device(s) supporting SL functionality, e.g., UE-type Positioning Reference Units (PRU(s)), or UE-to-network relaying UE(s) can be utilized with the same proposed functionalities of the present application. A network can (pre-) configure SL PRS transmission(s) based on at least one of the following information.

In one example, the RSU/network can collect capability information of UE(s) related to SL positioning during or beforehand a positioning session. While existing LPP procedures via UL/DL can be used for this purpose, UEs can also indicate their capability information via SCI, RRC, or MAC CE over SL along with other SL transmission(s), such as CAM(s) or other V2X message(s) indicating its/their positioning request, which would be more efficient from latency point of view.

In another example, the network can proactively determine PRS transmission(s) based on UE mobility and other SL information (implementation aspect): From the SL transmission(s) of UE(s) such as CAM(s)/DENM(s) indicating UE speed, direction, etc., network can acquire information relevant for configuring the SL PRS. For example, for high-speed vehicles, network can configure SL PRS with high repetition rate, or SL PRS can be transmitted on antenna beams matching to the UE mobility parameters.

Similarly, the network may determine the SL PRS configuration based on the confidence of the UE location information contained within the CAM(s) or other V2X message(s). For example, for UEs having less confidence in accuracy, network may configure larger-bandwidth SL PRS transmissions for more accurately positioning them.

The network can proactively determine PRS transmission(s) based on positioning QoS requirement prior to the positioning request of the UE to help network determining the SL PRS configuration. For example, a network can determine the PRS transmission(s) prior to positioning session: such as based on past history and statistical properties of any collected information.

For example, UEs in a certain area at a certain time of the day would have similar capabilities, and demand similar positioning QoS, and network can pre-configure RSUs in this area with SL PRS matching to these conditions. Similarly, a network can provide a "default" SL PRS configuration for RSU(s) in an area that would at least enable coarse positioning of UE(s) (e.g., with low accuracy, for the first location fix).

Still further, the network can proactively determine PRS transmissions on-demand or dynamically (e.g., during a positioning session): such configuration would better match to the individual needs of UEs or changing environment conditions. For this purpose, additional information, such as specific positioning QOS requirement could be explicitly indicated by the UEs to the network.

With reference to FIG. 5, at a block 502, the network obtains notification of detection of a UE. As previously described, in one embodiment, an initial RSU/anchor detects presence of UE(s) (e.g., vehicles) based on their SL transmissions.

Illustratively, RSU(s) or other network entity/entities can sense or receive SL transmission(s). For example, the RSU 102 can detect the UE 104 presence, such as by decoding received SL control or data message(s). The message(s) can be in the form of V2X data (e.g., sent via CAM(s)/DENM(s)).

The message(s) can also be in the form of measurements or detection of the received quality and/or power over SL, e.g., SL signal-to-noise ratio, SL Signal Received Power (SL RSRP) and/or Received Strength Signal Indicator (RSSI) information above/below one or more pre-configured threshold(s) to activate/deactivate SL PRS(s).

Additionally, the message(s) can also be in the form of SL Control Information (SCI), information in PSFCH, MAC CE, or a part of SL data payload that can indicate a positioning request of a UE. The detecting RSU/anchor 102A can then generate and transmit notification regarding the detected UE to infrastructure equipment, e.g., core network component(s).

Illustratively, the detecting RSU/anchor 102A can transmit notification(s)/information in accordance with LTE Positioning Protocol (LPP) protocol and/or NR Positioning Protocol (NRPP) protocol.

At a block 504, the network 108 identifies PRS transmission information. Illustratively, the network can proactively identify PRS transmission(s). The proactive identification of PRS transmission may be utilized in accordance with any number of process(es). In some embodiments, the network can implement machine learning algorithms or techniques, including various machine learning algorithms. Such machine learning algorithms can include machine learning algorithms that may be trained/configured in accordance with supervised, semi-supervised, or unsupervised models. Additional feedback/penalty models may be incorporated.

At a block 506, the network transmits identification of the additional RSU(s) to the UE. In some embodiments, the network may also transmit the identification to the RSU. The network may transmit the identification using LPP protocol and/or NRPP protocol.

At block 508, the network infrastructure may cause activation of the identified one or more additional RSU(s) so that the RSU(s) initiate(s) SL PRS transmission(s). In some embodiments, the network may proactively determine the additional SL PRS transmission(s) based on UE mobility and other SL information. For example, from the SL transmission(s) of the UE, such as CAM(s)/DENM(s) indicating UE speed and/or direction, etc., the network can acquire information relevant for configuring the SL PRS(s).

For example, for high-speed vehicles, network can configure SL PRS with high repetition rate, or SL PRS can be transmitted on antenna beams matching to the UE mobility parameters.

Similarly, the network may determine the SL PRS configuration(s) based on the confidence of the UE location information contained within the CAM(s). For example, for UE(s) having less confidence in accuracy, network may configure larger-bandwidth SL PRS transmission(s) for more accurately positioning them. In some embodiments, the network may proactively determine the additional PRS transmission(s) based on the positioning QOS requirement along with their positioning request to help network determining the SL PRS configuration(s). At block 510, the routine terminates.

Figure 6:
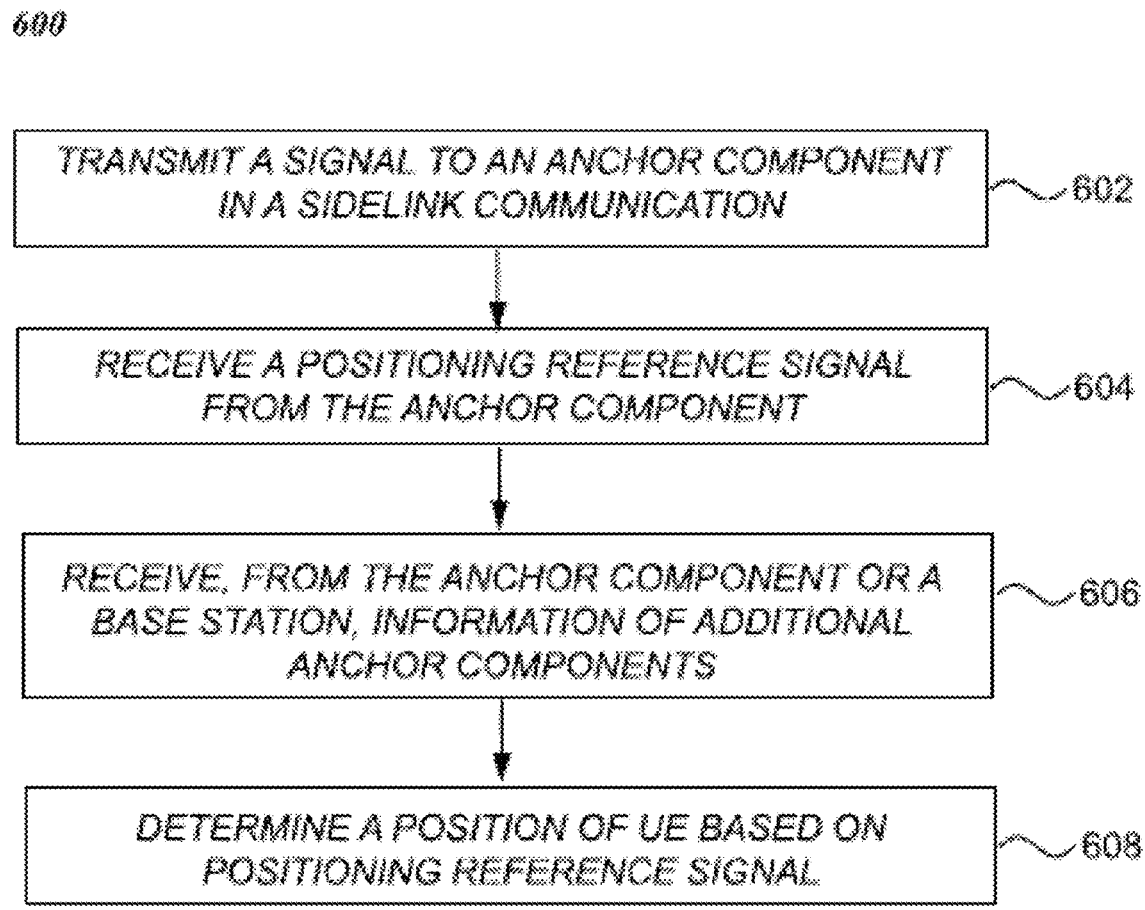
FIG. 6 is a flow diagram depicting an exemplary method for a UE in a sidelink communication, consistent with some embodiments of the present application.

FIG. 6 is a flow diagram depicting a method for a UE in a sidelink communication, consistent with some embodiments of the present application. Referring to FIG. 6, at a block 602, a UE, such as the UE 104A in FIG. 1, transmits a first signal to an anchor component, such as the anchor component 102A in FIG. 1, in the sidelink communication.

In some embodiments, the first signal transmitted to the anchor component may include at least one of: a CAM, a DENM, or a BSM. In some embodiments, the first signal transmitted to the anchor component may include at least one of a speed attribute or a direction attribute of the UE. In some embodiments, the first signal transmitted to the anchor component may include a request for a positioning reference signal activation transmitted by the UE.

At a block 604, the UE receives a positioning reference signal from the anchor component in response to the transmission of the first signal. The positioning reference signal can be used by the UE for determining a position of the UE.

In some embodiments, the transmission of the positioning reference signal is activated by the anchor component based on a detection of a presence of the user equipment.

At a block 606, the UE receives information regarding at least one additional anchor component(s). In some embodiments, the information regarding the at least one additional anchor component(s) is identified by the anchor component based on the detection of the presence of the UE, and the UE receives the information regarding the at least one additional anchor component(s) from the anchor component.

In some embodiments, the information regarding the at least one additional anchor component is identified by a base station, such as the gNB 110 in FIG. 1, based on the detection of the presence of the UE, and the UE receives the information regarding the at least one additional anchor component from the base station.

At a block 608, the UE determines the position of the UE based on the positioning reference signal(s) received from the anchor component. In some embodiments, the UE determines the position of the UE based on a plurality of positioning reference signals received from a plurality of activated anchor components, including the anchor component.

In some embodiments, the UE determines its position by employing either timing-based methods (e.g., time difference of arrival (TDOA) or round-trip transmission (RTT)) or angle-based methods, using the received positioning reference signal(s).

In some embodiments, the operation in block 606 and the operation in block 608 may be switched. In some embodiments, any of the operations in blocks 606 and 608 may be optional. Any embodiment (two or more) described in this disclosure may be used in combination. This combination may make use of logical "or", "and", and/or "exclusive or" between any embodiment.

Although the example of 5G NR was used in this disclosure, other Radio Access Technologies or Networks are possible, such as LTE, or 3GPP 6G. Other systems are possible, such as IEEE 802.11 and its derivatives, Wi-Fi, WiMAX, etc.

Clause 1 A method for positioning in a sidelink communication, the method comprising:
  detecting, by an anchor component in the sidelink communication, a presence of at least one user equipment in the sidelink communication; and
  activating, by the anchor component, a transmission of a positioning reference signal to the at least one user equipment for positioning responsive to the detected presence of the at least one user equipment.

Clause 2 The method as recited in Clause 1, wherein the method further comprises:
  identifying, by the anchor component, at least one additional anchor component based on the detected presence of the at least one user equipment; and
  transmitting, by the anchor component, information regarding the identified at least one additional anchor component to the at least one detected user equipment.

Clause 3 The method as recited in Clause 1, wherein the method further comprises:
  transmitting, to a network infrastructure, a notification corresponding to the detected presence of the at least one user equipment; and
  receiving, from the network infrastructure, information regarding at least one additional anchor component identified by the network infrastructure based on the notification.

Clause 4 The method as recited in Clause 1, wherein the method further comprises:
  determining, by the anchor component, whether the at least one user equipment is still present; and
  deactivating, by the anchor component, the transmission of the positioning reference signal in response to a determination that the at least one user equipment is not present.

Clause 5 The method as recited in Clause 1, wherein the anchor component detects the presence of the at least one user equipment based on a receipt of a signal transmitted by the at least one user equipment.

Clause 6 The method as recited in Clause 5, wherein the signal transmitted by the at least one user equipment comprises at least one of: a cooperative awareness message (CAM), a decentralized environmental notification message (DENM), or a basic safety message (BSM).

Clause 7 The method as recited in Clause 5, wherein the anchor component detects the presence of the at least one user equipment based on a received power level of the signal transmitted by the at least one user equipment being greater than a first predetermined threshold.

Clause 8 The method as recited in Clause 5, wherein the anchor component detects the presence of the at least one user equipment based on a content obtained by decoding the signal transmitted by the at least one user equipment.

Clause 9 The method as recited in Clause 5, wherein the anchor component configures at least one of parameters for a positioning reference signal based on at least one of a position attribute, a position confidence attribute, a positioning capability attribute, a speed attribute, or a direction attribute of the at least one user equipment included in the signal transmitted by the at least one user equipment.

Clause 10 The method as recited in Clause 1, wherein the anchor component detects the presence of the at least one user equipment based on a request for a positioning reference signal activation indicated by the at least one user equipment.

Clause 11 The method as recited in Clause 1-, wherein the request for the positioning reference signal activation is included in at least one of: a CAM, a DENM, a BSM, a sidelink control information (SCI) transmission, a physical sidelink feedback channel (PSFCH) transmission, a medium access control (MAC) control element (CE) transmission, or a sidelink data payload.

Clause 12 The method as recited in Clause 2, wherein the anchor component identifies the at least one additional anchor component based on at least one of a position attribute, a position confidence attribute, a positioning capability attribute, a speed attribute, or a direction attribute of the at least one user equipment.

Clause 13 The method as recited in Clause 2, wherein transmitting the information regarding the identified at least one additional anchor component to the at least one detected user equipment comprises:
  transmitting a list identifying a plurality of additional anchor components including the at least one additional anchor component.

Clause 14 The method as recited in Clause 13, wherein the list identifying the plurality of additional anchor components includes at least one of priority information or positioning reference signal parameter information, associated with each of the plurality of additional anchor components.

Clause 15 The method as recited in Clause 5, wherein the determination that the at least one user equipment is not present is performed based on a signal received from the at least one user equipment.

Clause 16 The method as recited in Clause 15, wherein the determination that the at least one user equipment does not present is performed based on a received power level of the signal received from the at least one user equipment being smaller than a second predetermined threshold.

Clause 17 An apparatus for positioning in a sidelink communication, the apparatus comprising:
  a memory storing an instruction; and
  a processor configured to execute the instruction stored in the memory to:
    detect a presence of at least one user equipment in the sidelink communication; and
    activate a transmission of a positioning reference signal to the at least one user equipment responsive to the detected presence of the at least one user equipment.

Clause 18 The apparatus as recited in Clause 17, wherein the processor is further configured to:
  identify at least one additional apparatus based on the detected presence of the at least one user equipment; and
  transmit information regarding the identified at least one additional apparatus to the at least one detected user equipment.

Clause 19 The apparatus as recited in Clause 17, wherein the processor is further configured to:
  transmit, to a network infrastructure, a notification corresponding to the detected presence of the at least one user equipment; and
  receive, from the network infrastructure, information regarding at least one additional apparatus identified by the network infrastructure based on the detected presence of the at least one user equipment.

Clause 20 The apparatus as recited in Clause 17, wherein the processor is further configured to:
  determine whether the at least one user equipment is still present; and
  deactivate the transmission of the positioning reference signal responsive to determining that the at least one user equipment is not present.

Clause 21 A non-transitory computer-readable medium storing instructions that are executable by one or more processors of an apparatus to perform a method for positioning in a sidelink communication, the method comprising:
  detecting, by an anchor component in the sidelink communication, a presence of at least one user equipment in the sidelink communication; and
  activating, by the anchor component, a transmission of a positioning reference signal to the at least one user equipment for positioning responsive to the detected presence of the at least one user equipment.

Clause 22 The non-transitory computer-readable medium of Clause 21, wherein the method further comprises:
  identifying, by the anchor component, at least one additional anchor component based on the detected presence of the at least one user equipment; and
  transmitting, by the anchor component, information regarding the identified at least one additional anchor component to the at least one detected user equipment.

Clause 23 The non-transitory computer-readable medium of Clause 21, wherein the method further comprises:
  transmitting, to a network infrastructure, a notification corresponding to the detected presence of the at least one user equipment; and
  receiving, from the network infrastructure, information regarding at least one additional anchor component identified by the network infrastructure based on the detected presence of the at least one user equipment.

Clause 24 The non-transitory computer-readable medium of Clause 21, wherein the method further comprises:
  determining, by the anchor component, whether the at least one user equipment is still present; and
  deactivating, by the anchor component, the transmission of the positioning reference signal in response to a determination that the at least one user equipment does not present.

Clause 25 A method for a user equipment in a sidelink communication, wherein the method comprising:
  transmitting, by the user equipment, a first signal to an anchor component in the sidelink communication; and
  receiving, from the anchor component, a positioning reference signal in response to the transmission of the first signal, the positioning reference signal being used by the user equipment for determining a position of the user equipment,
  wherein the transmission of the positioning reference signal is activated by the anchor component based on a detection of a presence of the user equipment.

Clause 26 The method as recited in Clause 25, wherein the first signal transmitted to the anchor component comprises at least one of: a cooperative awareness message (CAM), a decentralized environmental notification message (DENM), or a basic safety message (BSM).

Clause 27 The method as recited in Clause 25, wherein the first signal transmitted to the anchor component comprises at least one of a position attribute, a position confidence attribute, a positioning capability attribute, a speed attribute, or a direction attribute of the user equipment.

Clause 28 The method as recited in Clause 25, wherein the first signal transmitted to the anchor component comprises a request for a positioning reference signal activation transmitted by the user equipment.

Clause 29 The method as recited in Clause 25, wherein the method further comprises:
  receiving, from the anchor component, information regarding at least one additional anchor component identified by the anchor component based on the detection of the presence of the user equipment.

Clause 30 The method as recited in Clause 25, wherein the method further comprises:
  receiving, from a network infrastructure, information regarding at least one additional anchor component identified by the network infrastructure based on the detection of the presence of the user equipment.

Clause 31 The method as recited in Clause 25, wherein the method further comprises:
  determining a position of the user equipment based on the received positioning reference signal using at least one of: a time difference of arrival (TDOA) method, a round-trip transmission method, or an angle-based method.

Clause 32 An apparatus (User equipment) in a sidelink communication, the user equipment comprising:
  a memory storing an instruction; and a processor configured to execute the instruction stored in the memory to:
  transmit a first signal to an anchor component in the sidelink communication; and receive, from the anchor component, a positioning reference signal in response to the transmission of the first signal, the positioning reference signal being used by the user equipment for determining a position of the user equipment, wherein the transmission of the positioning reference signal is activated by the anchor component based on a detection of a presence of the user equipment.

Clause 33 A non-transitory computer-readable medium storing instructions that are executable by one or more processors of user equipment to perform a method for positioning in a sidelink communication, the method comprising:
  transmitting, by the user equipment, a first signal to an anchor component in the sidelink communication; and
  receiving, from the anchor component, a positioning reference signal in response to the transmission of the first signal, the positioning reference signal being used by the user equipment for determining a position of the user equipment,
  wherein the transmission of the positioning reference signal is activated by the anchor component based on a detection of a presence of the user equipment.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be fully automated via software code modules, including one or more specific computer-executable instructions executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions.

A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process.

Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

This application claims the benefit of U.S. Provisional Application No. 63/335,622, entitled EVENT-DRIVEN ACTIVATION OF ANCHORS FOR SIDELINK POSITIONING, and filed on Apr. 27, 2022. U.S. Provisional Application No. 63/335,622 is incorporated in its entirety by reference herein.

The invention claimed is:

1. A method for positioning in a sidelink communication, the method comprising:
   detecting, by an anchor component performing the sidelink communication, a presence of at least one user equipment in the sidelink communication;
   transmitting, by the anchor component, to a network infrastructure, a notification regarding the detected presence of the at least one user equipment; and
   receiving, by the anchor component, information regarding at least one additional anchor component identified by the network infrastructure based on the notification, from the network infrastructure.

2. The method as recited in claim 1, wherein the method further comprises:
   transmitting, by the anchor component, information regarding the at least one additional anchor component to the at least one user equipment.

3. The method as recited in claim 1, wherein the method further comprises:
   activating, by the anchor component, a transmission of a positioning reference signal to the at least one user equipment for positioning responsive to the detected presence of the at least one user equipment.

4. The method as recited in claim 1, wherein the method further comprises:
   determining, by the anchor component, whether the at least one user equipment is still present; and
   deactivating, by the anchor component, the transmission of the positioning reference signal in response to a determination that the at least one user equipment is not present.

5. The method as recited in claim 1, wherein the anchor component detects the presence of the at least one user equipment based on a receipt of a signal transmitted by the at least one user equipment.

6. The method as recited in claim 5, wherein the signal transmitted by the at least one user equipment comprises at least one of: a cooperative awareness message (CAM), a decentralized environmental notification message (DENM), or a basic safety message (BSM).

7. The method as recited in claim 5, wherein the anchor component detects the presence of the at least one user equipment based on a received power level of the signal transmitted by the at least one user equipment being greater than a first predetermined threshold.

8. The method as recited in claim 5, wherein the anchor component detects the presence of the at least one user equipment based on a content obtained by decoding the signal transmitted by the at least one user equipment.

9. The method as recited in claim 5, wherein the anchor component configures at least one of parameters for a positioning reference signal based on at least one of a position attribute, a position confidence attribute, a positioning capability attribute, a speed attribute, or a direction attribute of the at least one user equipment included in the signal transmitted by the at least one user equipment.

10. The method as recited in claim 1, wherein the anchor component detects the presence of the at least one user equipment based on a request for a positioning reference signal activation indicated by the at least one user equipment.

11. The method as recited in claim 10, wherein the request for the positioning reference signal activation is included in at least one of: a CAM, a DENM, a BSM, a sidelink control information (SCI) transmission, a physical sidelink feedback channel (PSFCH) transmission, a medium access control (MAC) control element (CE) transmission, or a sidelink data payload.

12. The method as recited in claim 2, wherein transmitting the information regarding the at least one additional anchor component to the at least one user equipment comprises:
transmitting a list identifying a plurality of additional anchor components including the at least one additional anchor component.

13. The method as recited in claim 12, wherein the list identifying the plurality of additional anchor components includes at least one of priority information or positioning reference signal parameter information, associated with each of the plurality of additional anchor components.

14. The method as recited in claim 4, wherein the determination that the at least one user equipment is not present is performed based on a signal received from the at least one user equipment.

15. The method as recited in claim 14, wherein the determination that the at least one user equipment is not present is performed based on a received power level of the signal received from the at least one user equipment being smaller than a second predetermined threshold.

16. An anchor apparatus for positioning in a sidelink communication, the apparatus comprising:
a memory storing an instruction; and
a processor configured to execute the instruction stored in the memory to:
perform the sidelink communication,
detect a presence of at least one user equipment in the sidelink communication,
transmit, to a network infrastructure, a notification corresponding to the detected presence of the at least one user equipment, and
receive, from the network infrastructure, information regarding at least one additional anchor apparatus identified by the network infrastructure based on the notification.

17. The anchor apparatus as recited in claim 16, wherein the processor is further configured to:
transmit information regarding the at least one additional anchor apparatus to the at least one user equipment.

18. The anchor apparatus as recited in claim 16, wherein the processor is further configured to:
activate a transmission of a positioning reference signal to the at least one user equipment responsive to the detected presence of the at least one user equipment.

19. A non-transitory computer-readable medium storing instructions that are executable by one or more processors of an apparatus to perform a method for positioning in a sidelink communication, the method comprising:
detecting, by an anchor component performing the sidelink communication, a presence of at least one user equipment in the sidelink communication;
transmitting, by the anchor component, to a network infrastructure, a notification corresponding to the detected presence of the at least one user equipment; and
receiving, by the anchor component, information regarding at least one additional anchor component identified by the network infrastructure based on the notification.

* * * * *